United States Patent
Lee et al.

(10) Patent No.: US 8,451,275 B2
(45) Date of Patent: May 28, 2013

(54) METHOD OF ANIMATING VECTOR GRAPHICS

(75) Inventors: Kok Peng Lee, Selangor (MY); Foot Yow Wong, Negeri Sembilan (MY); Kin Hoon Wong, Selangor (MY)

(73) Assignee: Ecava SDN. BHD., Kuala Lumpur (MY)

( * ) Notice: Subject to any disclaimer, the term of this patent is extended or adjusted under 35 U.S.C. 154(b) by 1306 days.

(21) Appl. No.: 11/877,406

(22) Filed: Oct. 23, 2007

(65) Prior Publication Data
US 2008/0094401 A1    Apr. 24, 2008

Related U.S. Application Data

(60) Provisional application No. 60/854,111, filed on Oct. 24, 2006.

(51) Int. Cl.
*G06T 13/00* (2011.01)

(52) U.S. Cl.
USPC .......................................... 345/473; 717/139

(58) Field of Classification Search
USPC .......................................... 345/473; 717/139
See application file for complete search history.

(56) References Cited

U.S. PATENT DOCUMENTS

2004/0225648 A1* 11/2004 Ransom et al. .................. 707/3
2005/0155043 A1*  7/2005 Schulz et al. ................. 719/328

FOREIGN PATENT DOCUMENTS

WO    2004109554 A1    12/2004

OTHER PUBLICATIONS

Rodrigo, Garcia Garcia; Esther, Gelle "SVG for SCADA Applications, A practical Approach" 2004, pp. 1-10 http://www.svgopen.org/2004/papers/SVGforSCADA/.
Rosner, Sharon "SCADA 2.0—Present And Future" "SVG For SCADA Visualization" Blog posted Jun. 30, 2006, pp. 1-6 http://scada2.blogspot.com/2006/06/svg-for-scada-visualization.html.
"SVG and OPC-DA" Oct. 2005, pp. 1-4 Blog Postings from http://www.control.com/1026215289/index_html.
Keystone Agile Application Framework "SVG For Data Driven Graphics" Jul. 4, 2005 (6 pages).

* cited by examiner

*Primary Examiner* — Maurice L McDowell, Jr.
(74) *Attorney, Agent, or Firm* — Volpe and Koenig, P.C.

(57) ABSTRACT

A method of simplifying the programming of animation of vector graphics for the graphic user interface of, for example, a SCADA system. The programming method allows the programmer to input unique yet simple instruction codes instead of inputting multiple lines of logic script to animate vector graphic objects and texts. An animation engine is used to interpret the simple instruction codes and instruct the browser to perform the necessary animation on the selected vector graphic objects.

20 Claims, 9 Drawing Sheets

| Present method (using standard JavaScript® codes) | Present invention (using specialized instruction codes with an animation engine) |
| --- | --- |
| Multiple attributes inserted into SVG graphic object | One attribute inserted into SVG graphic object |
| Requires JavaScript® programming | No programming required |
| The document author needs to write extensive scripts to animate each and every element he wants to animate within the SVG file | The document author only needs to key in simple instruction under a predefined syntax to animate the desired objects |
| The document author needs to write a script to check for new values of the tag he intends to examine | The animation engine handles tag value querying automatically |
| The document author needs to possess sufficient knowledge on the graphic object file format | Minimal knowledge of the graphic object file format required |
| The document author needs to duplicate the same JavaScript® programming codes for every new SVG file he wants to animate | No programming involved, the document author only needs to key in simple instructions under a predefined syntax |

Fig. 7

METHOD OF ANIMATING VECTOR GRAPHICS

CROSS-REFERENCES TO RELATED APPLICATIONS

This application claims priority to, and incorporates by reference herein in its entirety, U.S. States Provisional Patent Application Ser. No. 60/854,111, filed 24 Oct. 2006.

FIELD OF THE INVENTION

The present invention resides in the technical field of computer systems for monitoring and/or controlling processes. More specifically, the invention relates to user interfaces and especially computer-generated graphics. More particularly, the invention concerns methods of programming animations for computer-generated graphics.

BACKGROUND OF THE INVENTION

SCADA systems (Supervisory Control and Data Acquisition) provide operators with a graphical user interface needed to monitor and control, for instance, the production process in an industrial plant. They can be used to monitor and control a plant or equipment in industries such as water and waste control, oil and gas refining, pulp and paper etc. A SCADA system collects the status and any other information from the plant/equipment and presents them to the operator through a computer screen with a graphic user interface known as the Human Machine Interface (HMI).

However, since no one factory or plant is identical to another in terms of layout or architecture, every SCADA system will be unique to the particular factory or plant. Therefore, the Human Machine Interface (HMI) for each SCADA system will need to be configured and constructed accordingly to suit the needs of each factory/plant. System Integration (SI) engineers are usually responsible to integrate a SCADA system into either a factory/plant or a machine. Every piece of machinery or controls or gauges controlled and monitored by the SCADA system will appear as an object on the HMI. Colored graphics are used on the HMI to make them readily understandable.

The use of bitmap graphics for HMI has been known to be problematic due to the extensive amount of work required to program and/or customize them for different factories/plants. The work required to animate and customize bitmap graphics includes: creating and coloring the individual animation frames and editing frame by frame any necessary changes to each frame of an animation for customization. Also, bitmap graphics, and especially animated bitmap graphics, tend to have large file sizes and so require considerable computer memory for storage. Even the highly compressed animated GIF files with limited color palettes (from 2 colors to 256 colors) tend to be very big, especially when the objects they are representing have high on-screen pixel counts. Loading and/or animating bitmap graphics therefore tends to be very slow, and animating them tends to drain a lot of processor power from the CPU, slowing down computers with limited processing power.

Vector graphics, by comparison, can be handled and manipulated much more easily. Since the shapes and colors of the objects or texts defined under vector graphics are determined by a few bytes of computer codes, they can be changed with just a few keystrokes, and the objects displayed on the HMI can be animated easily with the insertion of a few instruction codes into the vector graphics files. Also, since vector graphic files are really small, they tend to load very fast, and require a lot less computing power from the CPU for animation.

However, in the conventional handling of vector graphic animation work or scripting, a programmer often needs to write from scratch, a script according to the animation desired. For example, a color animation (change of color) would require a programmer to draw a vector graphic object, followed by a script that searches for the graphic element by recognizing its Identity (ID) or Name, and then finally change its "filled" property to the desired color. Therefore, the conventional way to animate vector graphics requires extensive knowledge and experience in the manipulation of Document Object Model (DOM) objects or Extensive Markup Language (XML) format.

As use herein, the term "animation" refers to any change in the appearance of a displayed object, and so includes changes in such features as color, opacity, position, size, motion, orientation, or any combination of feature such as these. So, there is not necessarily movement on the screen.

SUMMARY OF INVENTION

It is therefore an object of the invention to eliminate the hassle of writing a script in vector graphic animation work so as to simplify the process of authoring vector graphic animation. As a result, the programmer or SI engineer will not need to have in-depth knowledge in writing scripts for vector graphic object animation or for Document Object Model (DOM) objects, and yet will still be able to produce the animation easily.

According to one aspect of the present invention, in a computer system for monitoring a process, the computer system having a graphical user interface for displaying the status of components used in operation of the process, each component being represented on the graphical user interface by an associated graphical object that is generated or rendered by an application from a related vector graphic file, the improvement comprises a method of animating said graphical object to show a change in the status of the component being represented, the method comprising:

inserting into said vector graphic file an animation instruction, the animation instruction complying with predefined syntax, the animation instruction not violating a prescribed format for the vector graphic file and the animation instruction being ignored by said application;

the animation instruction defining one or more animation effects that are dependent upon a value of at least one variable and a set of conditions applying to the at least one variable;

the value of said at least one variable being dependent upon the status of said component being represented; and running an interpreter engine to:
(a) recognize and parse said animation instruction,
(b) retrieve a current value of said at least one variable,
(c) determine a required animation effect based on checking the retrieved current value of the at least one variable against said set of conditions, and
(d) instruct the application to modify said graphical object to exhibit the determined animation effect.

In one embodiment, said application is a browser that supports the format of said vector graphic file.

In another embodiment of the present invention, said application is a browser having a plug-in vector graphic rendering engine that supports the format of said vector graphic file.

According to one preferred feature, said vector graphic file is of a text-based format.

Preferably, said vector graphic file is of Scalable Vector Graphic (SVG) format.

According to another embodiment of the present invention, said interpreter engine is loaded by said application.

Additionally, the vector graphic file may be loaded dynamically by said interpreter engine, or loaded by said application first and then parsed by said interpreter engine.

Preferably, said interpreter engine comprises JavaScript®.

According to one embodiment of the present invention, said animation instruction comprises at least one attribute and said at least one variable.

According to another embodiment of the present invention, said animation instruction further comprises at least one parameter.

According to a further embodiment of the present invention, step (d) comprises manipulating an object model or object properties or styles of said graphical object.

A computer system for monitoring a process according to one embodiment of the present invention comprises:

a graphical user interface for displaying the status of components used in operation of said process, each component being represented on the graphical user interface by an associated graphical object that is generated or rendered by an application from a related vector graphic file;

said vector graphic file including an animation instruction inserted into the vector graphic file, the animation instruction complying with predefined syntax, the animation instruction not violating a prescribed format for the vector graphic file and the animation instruction being ignored by said application;

the animation instruction defining one or more animation effects that are dependent upon a value of at least one variable and a set of conditions applying to the at least one variable;

the value of said at least one variable being dependent upon the status of said component being represented; and an interpreter engine to:
(a) recognize and parse said animation instruction,
(b) retrieve a current value of said at least one variable,
(c) determine a required animation effect based on checking the retrieved current value of the at least one variable against said set of conditions, and
(d) instruct the application to modify said graphical object to exhibit the determined animation effect so as to show a change in status of the component being represented by said graphical object.

In one embodiment, said application is a browser that supports the format of said vector graphic file.

In another embodiment of the present invention, said application is a browser having a plug-in vector graphic rendering engine that supports the format of said vector graphic file.

According to one preferred feature, said vector graphic file is of a text-based format.

Preferably, said vector graphic file is of Scalable Vector Graphic (SVG) format.

According to another embodiment of the present invention, said interpreter engine is loaded by said application.

Additionally, the vector graphic file may be loaded dynamically by said interpreter engine, or loaded by said application first and then parsed by said interpreter engine.

Preferably, said interpreter engine comprises JavaScript®.

According to one embodiment of the present invention, said animation instruction comprises at least one attribute and said at least one variable.

According to another embodiment of the present invention, said animation instruction further comprises at least one parameter.

According to a further embodiment of the present invention, the interpreter engine modifies said graphical object by manipulating an object model or object properties or styles of said graphical object.

Thus, the invention allows the realization of speedier customization of a SCADA system for a factory, plant, machine or any process to be monitored or controlled. Even an experienced SI engineer or programmer with extensive knowledge in scripts and logic writing or in the manipulation of DOM objects or XML format will find the use of the simplified syntax to be less time-consuming in integrating a SCADA system to a factory/plant or machine. The simplified syntax also makes it easier for the SI engineer or programmer to troubleshoot any errors in the scripts/instruction codes. In use, the animation instruction is simply parsed with an external script to perform the animation accordingly.

Basically, vector graphic animation can be done in either of two following ways:

1. Using existing built-in animation support by the scalable vector graphic format, or
2. Manipulation of the vector graphic object using additional (internal or external) script or application.

The present invention concerns animation realized under the method of category 2 above.

A built-in syntax of SVG proposed by W3C to perform animation of SVG objects describes how to setup an animation, with multiple attributes but it does not tie the animation to any variable with conditions. So, the existing built-in animation does not allow animation that associates with any data input, but only one that animates on its own, without considering any data update.

Existing methodology requires the SVG document author to write some JavaScript® functions himself/herself to animate the SVG object. This requires the SVG document author to have certain level of programming skill. Also, the method is restricted to SVG animation since the script is totally customized for the document.

Using an SVG graphic editor (for example, Inkscape) to draw the SVG graphics requires modifying the SVG file manually to achieve the effects required, while embodiments of the present invention allow the user to configure the animation directly in Inkscape graphic editing mode, with very simple syntax.

As will become apparent from the detailed description that follows, in accordance with embodiments of the present invention as little as a single line of animation instruction conforming to predefined syntax can be embedded into a vector graphic element as one single attribute and allows the tying of a variable to animation to enable different animation effects based on different conditions prevailing in the process being monitored.

The animation instruction comprises additional, proprietary (non-standard) declaratives that are embedded with the vector graphic file. For example, in regard to SVG standard, proprietary declaratives simply means any declaratives not understood by current SVG standard, whose syntax is defined and published by W3C's SVG working group.

BRIEF DESCRIPTION OF THE DRAWINGS

The invention is illustrated, though not limited, by the following detailed description of preferred embodiments, that is given by way of example only with reference to the accompanying drawings, in which:

FIG. 7 is a table comparing the differences between the existing method of performing animation on a vector graphic object and a method of performing animation on a vector graphic object according to an embodiment of the present invention.

DETAILED DESCRIPTION AND BEST MODE

Embodiments of a computer-implemented method and system for animating vector graphics are described herein. In the following description numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring the key aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. A "browser" is defined herein to be an application program, executed during either a pre-boot runtime or an operating system ("OS") runtime, that allows a user to navigate through and read text files and optionally allows the user to input changes to update the text files. A browser may include further functionality for displaying graphics. One example of a browser is a web browser.

Figure 1:
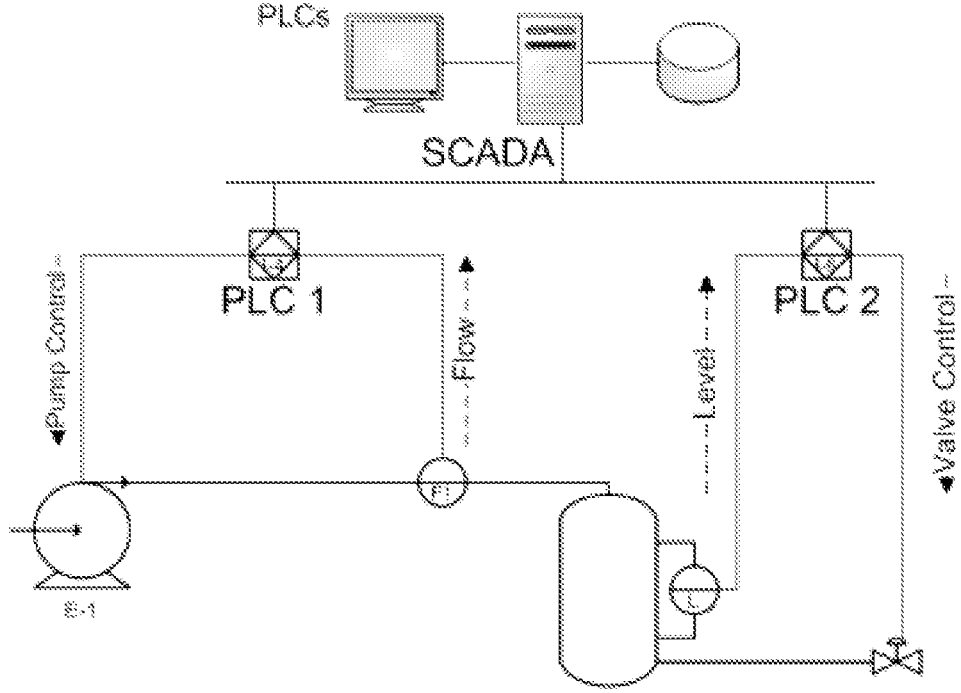
FIG. 1 illustrates a typical SCADA system.

In an exemplary SCADA system as illustrated in FIG. 1, the Human Machine Interface (HMI) is a computer monitor connected to a CPU which acts as a Remote Terminal Unit (RTU) that indirectly controls and monitors the operation of a pump E1 and a valve V2.

Data acquisition begins at the RTU or Programmable Logic Controller (PLC) level and includes meter readings and equipment status signals that are communicated to SCADA as required. Data is then compiled and formatted in such a way that a control room operator using the HMI can make appropriate supervisory decisions that may be required to adjust or over-ride normal RTU (PLC) controls.

Figure 2:
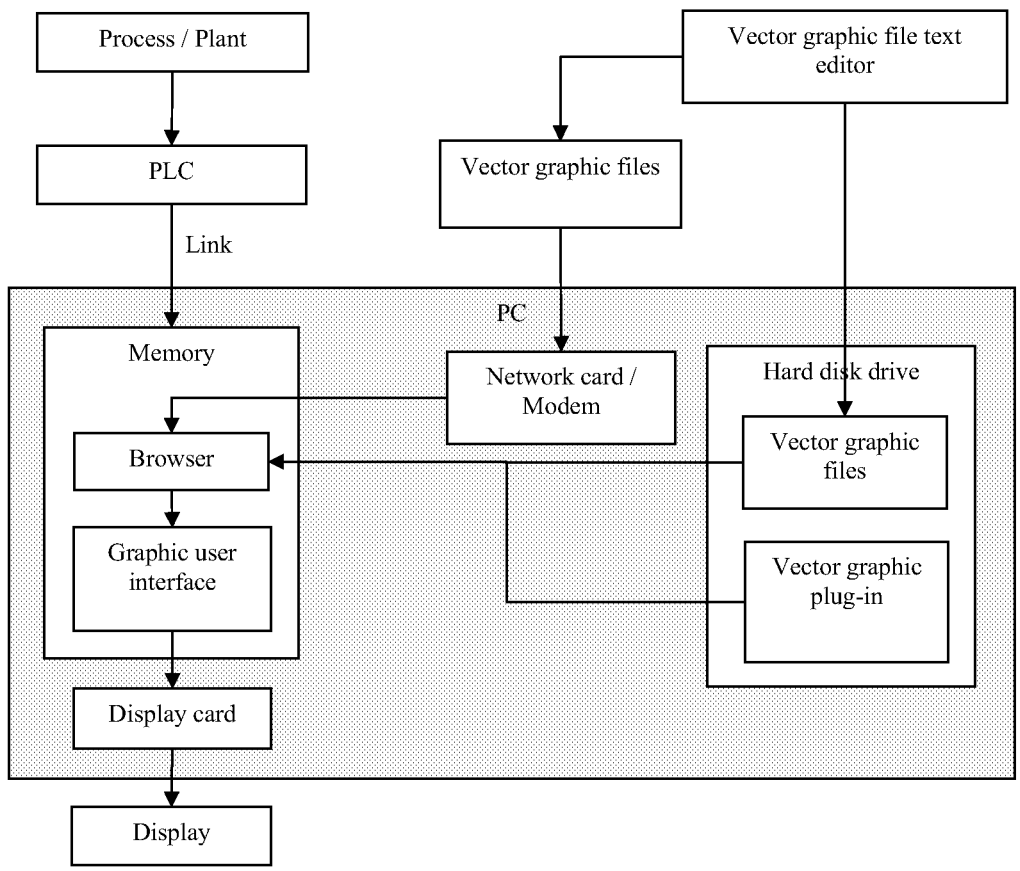
FIG. 2 is a diagram illustrating features of a SCADA system, in accordance with one embodiment of the present invention, for use in the monitoring and displaying of the status of a network of hardware inside a plant or a factory or machine.

During operation, readings from the RTU or PLC are collected in SCADA (in FIG. 1 SCADA is a server). The Human Machine Interface (HMI) employs the rendering capabilities of a browser, such as the Microsoft® Internet Explorer 5 (with SVG (Scalable Vector Graphics) plug-in) to display objects that show the status of the pump and the valve that are being monitored. When loaded in the CPU's memory (FIG. 2), the browser calls for an HTML page which contains links to either external (contained in some external server) or internal (contained within the SCADA server) SVG files, which define the shape, position, color, transparency plus other visual attributes of the objects that will be displayed on the computer monitor. Vector graphics files are created using publicly available vector graphics software such as Inkscape.

The browser loads any scripts that have been either embedded or linked externally (to an external server) or internally (within the SCADA server). The script then periodically collects and examines the data based on the 'variable' or 'tag' given in the animation instruction from the RTU or PLC and will instruct the browser to modify the appearance of the displayed objects according to their status.

Figure 3:
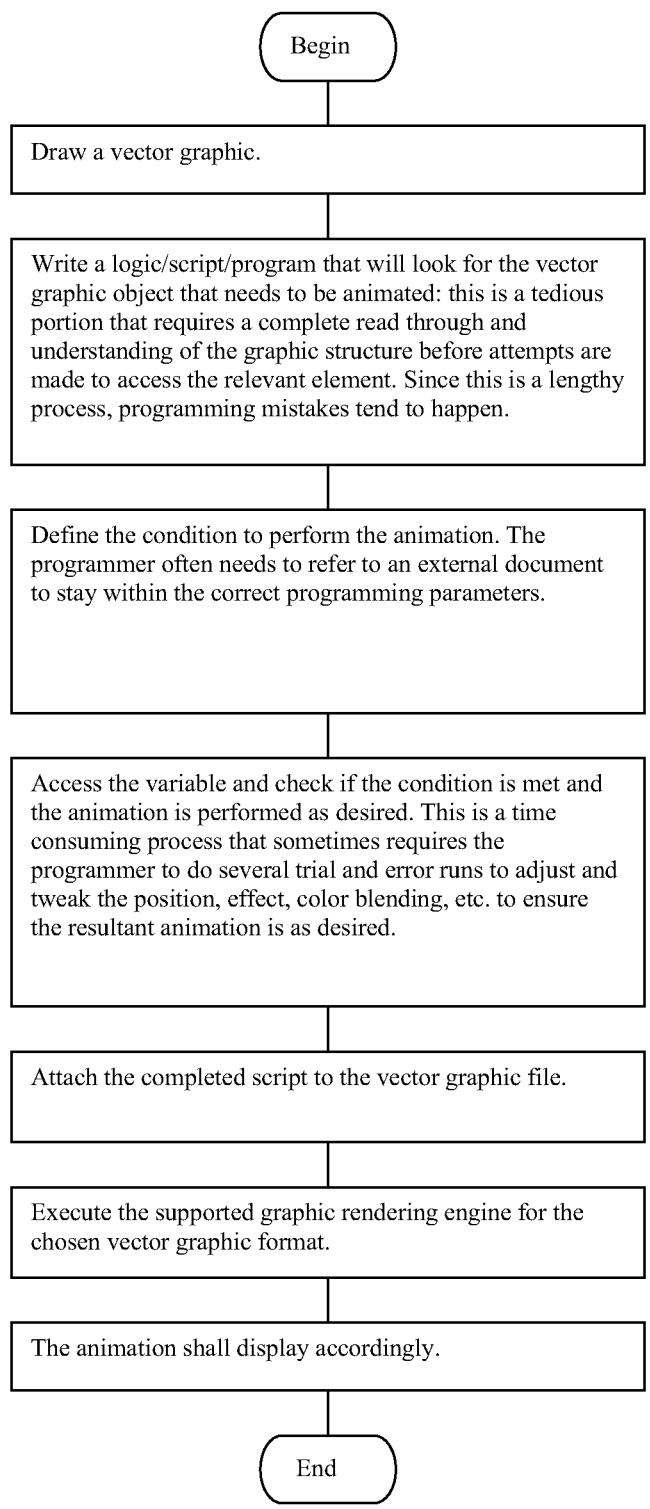
FIG. 3 is a flow chart of a prior art process of displaying and animating a vector graphic object.
Figure 4:
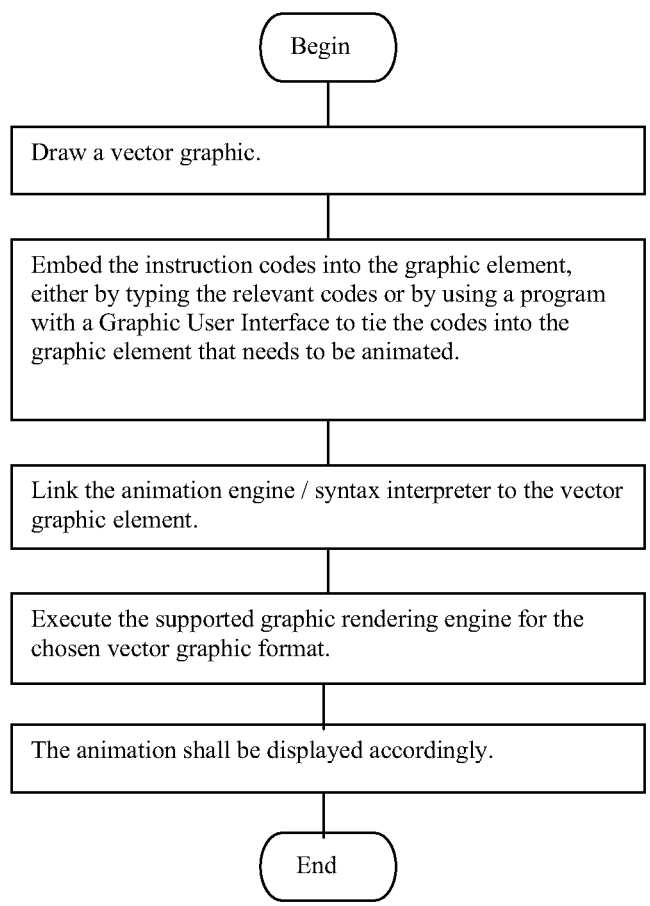
FIG. 4 is a flow chart of a process of displaying and animating a vector graphic object according to an embodiment of the present invention.

FIG. 3 illustrates the existing steps needed to perform the above tasks, starting from rendering or drawing objects, subsequently defining the attributes associated with those objects (whether they remain static or change according to certain inputs collected by SCADA) and defining the ways the objects should be animated, leading to the final step of animating the objects. Comparing FIG. 3 to FIG. 4, it is obvious that the steps needed to perform the above same tasks have been simplified, since logic scripts are no longer needed. Rather, short instruction codes are fed into a syntax interpreter or an animation engine which in turn uses those codes to instruct the browser to perform the necessary animation on the displayed objects. These short instructions codes are easily understood compared to standard XML logic scripts, so users/programmers/system integration engineers tend to make fewer mistakes when inputting them into a SCADA system.

The syntax interpreter or animation engine in the embodiment of the present invention is written in JavaScript®, but can potentially be written using other programming language and executed in other forms, such as an executable file or a browser plug-in.

The differences and advantages of the use of the animation engine over the existing way of programming the vector graphics objects (or scalable vector graphic objects) are tabulated in FIG. 7, where it is shown that a systems integration engineer with minimum knowledge in programming can potentially perform systems integration for a SCADA system.

Comparing a typical SVG animation with and without the animation instruction, by using the existing methodology, an SI engineer would need to but not limited to:

Write lengthy script for each and every graphic object he wants to animate, as follows:

```
<rect id="valveId" x="200" y="200" rx="20" ry="20"
  width="300" height="200" fill="black" stroke="#56f"
  stroke-width="10"/>
window.setInterval(checkValveStatus, 1000);
function checkValveStatus( )
{
```

```
        var newValue = server.getValue(valveStatus);
        if (newValue != valveStatus.value) {
          // get the object
          var idobj = svg.getElementById(id);
          // animate color
          if (valveStatus.value == 0) idobj.fill = 'black';
          if (valveStatus.value == 1) idobj.fill = 'brown';
          if (valveStatus.value == 2) idobj.fill = 'red';
          if (valveStatus.value == 3) idobj.fill = 'orange';
          if (valveStatus.value == 4) idobj.fill = 'yellow';
          // animate opacity
          if (valveStatus.value <= 0) idobj.opacity = 0;
          else if (valveStatus.value >= 4) idobj.opacity = 100;
          else idobj.opacity = valveStatus.value /4 *100;
        }
```

OR

Insert multiple attributes into the SVG graphic object; this could be in the following format or other format.

```
    <rect id="valveId" x="200" y="200" rx="20" ry="20"
        width="300" height="200" fill="black" stroke="#56f"
        stroke-width="10"
        scada.tagName="valveStatus"
        scada.fill="
          if (valveStatus.value == 0) this.fill = 'black';
          if (valveStatus.value == 1) this.fill = 'brown';
          if (valveStatus.value == 2) this.fill = 'red';
          if (valveStatus.value == 3) this.fill = 'orange';
          if (valveStatus.value == 4) this.fill = 'yellow';"
        scada.opacity="
          if (valveStatus.value <= 0) this.opacity = 0;
          else if (valveStatus.value >= 4) this.opacity = 100;
          else this.opacity = valveStatus.value /4 *100;"
    />
```

Write JavaScript® to check value of interested tag.

```
        window.setInterval(checkValueStatus, 1000);
        function checkValveStatus( )
        {
          var newValue = server.getValue(valveStatus);
          if (newValue != valveStatus.value) {
            animate(valveId, 'scada.fill');
            animate(valveId, 'scada.opacity');
          }
        }
```

Write JavaScript® to process the animation.

```
        function animate(id, func)
        {
          // this code is simplified to demonstrate the idea
          // it may not be working straight away
          // get the object
          var idobj = svg.getElementById(id);
          // execute the function given
          idobj.func( );
        }
```

On the other hand, with the presence of an animation engine or syntax interpreter in accordance with embodiments of the present invention, the same engineer would only need to insert single attribute into SVG graphic object:

```
    <rect id="valveId" x="200" y="200" rx="20" ry="20"
        width="300" height="200" fill="black" stroke="#56f"
        stroke-width="10"
        label="{attr:COLOR, tag:valveStatus,
          map:[0=black, 1=brown, 2=red, 3=orange, 4=yellow]},
          {attr:OPACITY, tag:valveStatus, max:4, min:0}"
    />
```

And that is all the engineer has to do; the rest is done by the animation engine.

Figure 5:
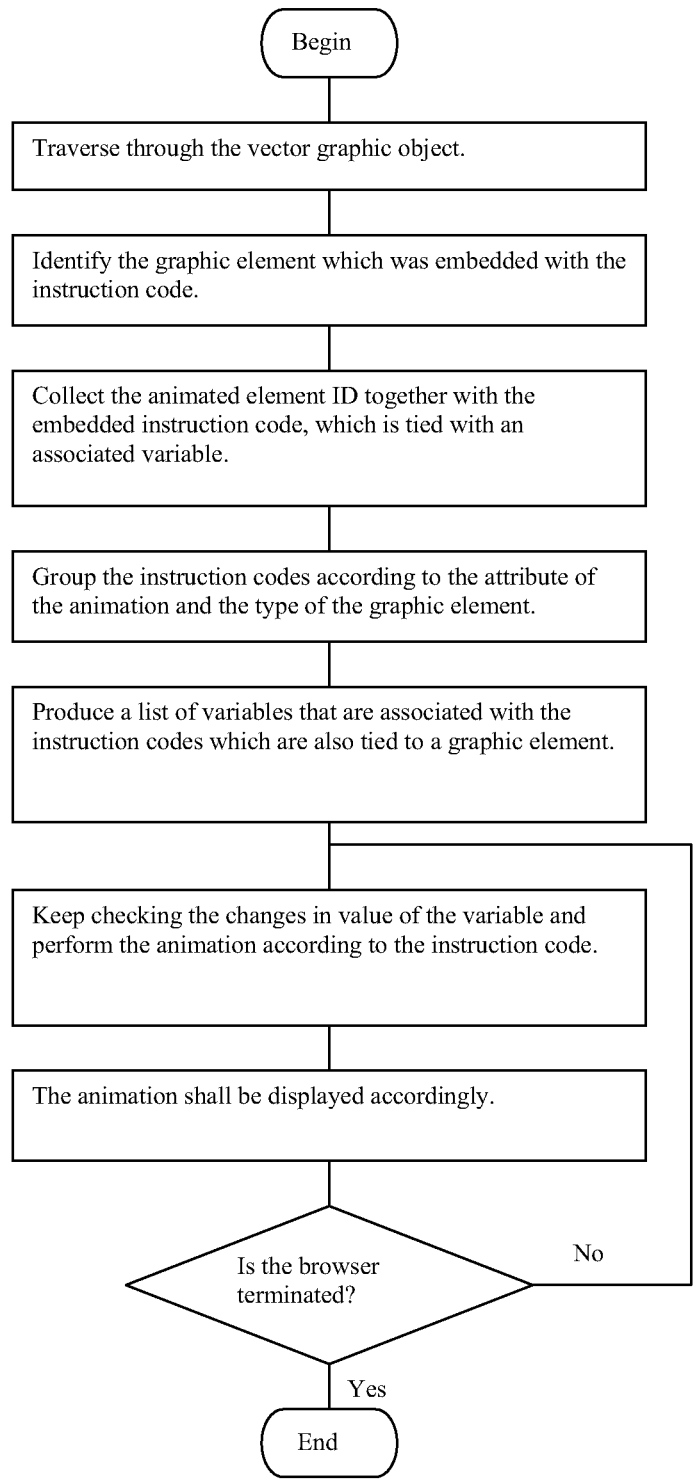
FIG. 5 is a flow chart illustrating the process going through the animation instruction interpreter or the animation engine according to an embodiment of the present invention.

The basic functions of the animation engine are outlined in the flowchart in FIG. 5. By taking over the function of identifying, locating and animating the desired object defined by a vector graphics file, the animation engine allows the users to input simple instruction codes into the SCADA system. The animation engine monitors the change of status to the objects (the pump and the valve) through a conditional loop in the flowchart.

Figure 6A:
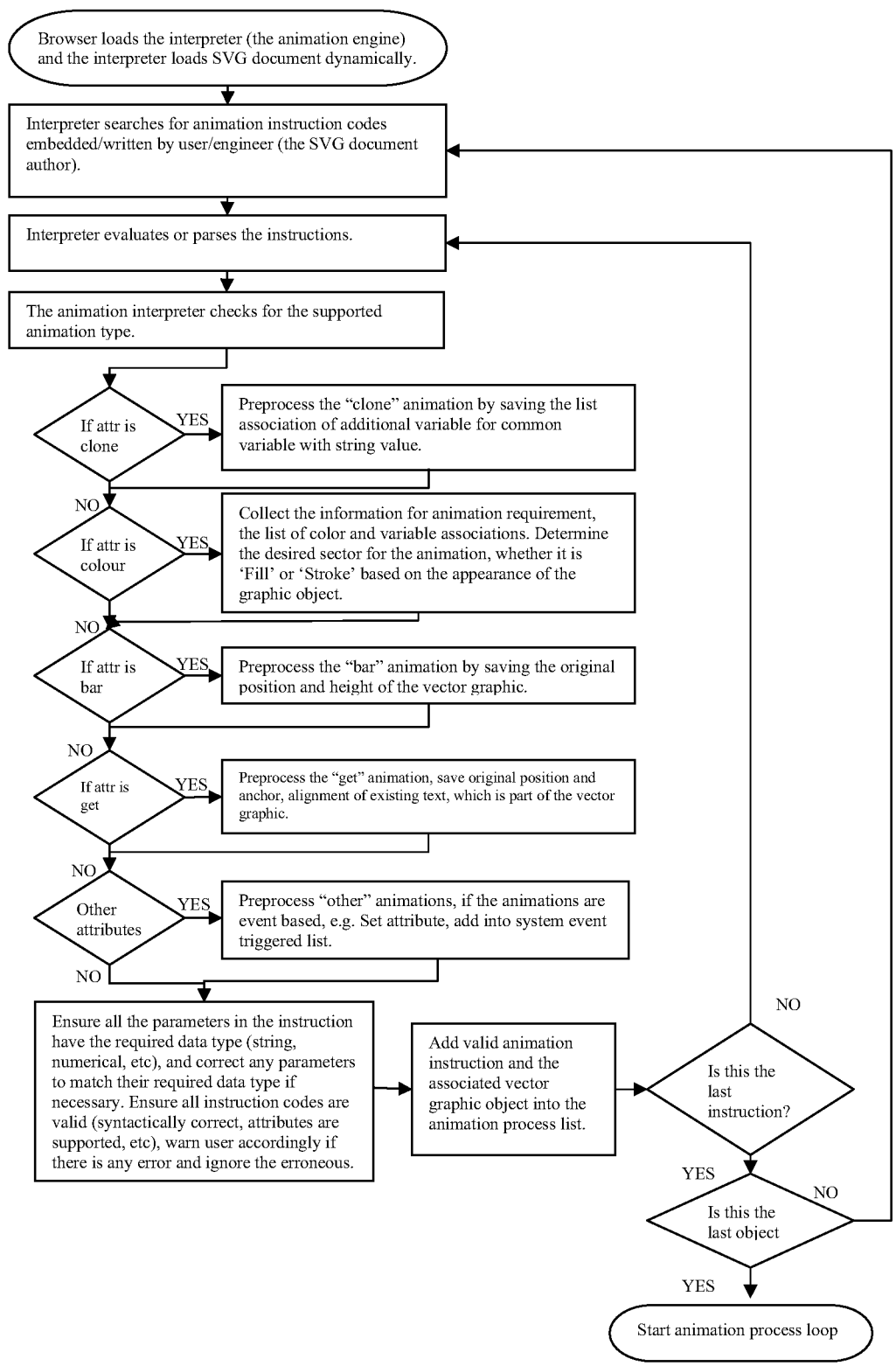
FIGS. 6a and 6b are an expanded version of FIG. 4, illustrating the detailed steps taken by the browser and the animation engine to animate a vector graphic element according to an embodiment of the present invention.
Figure 6B:
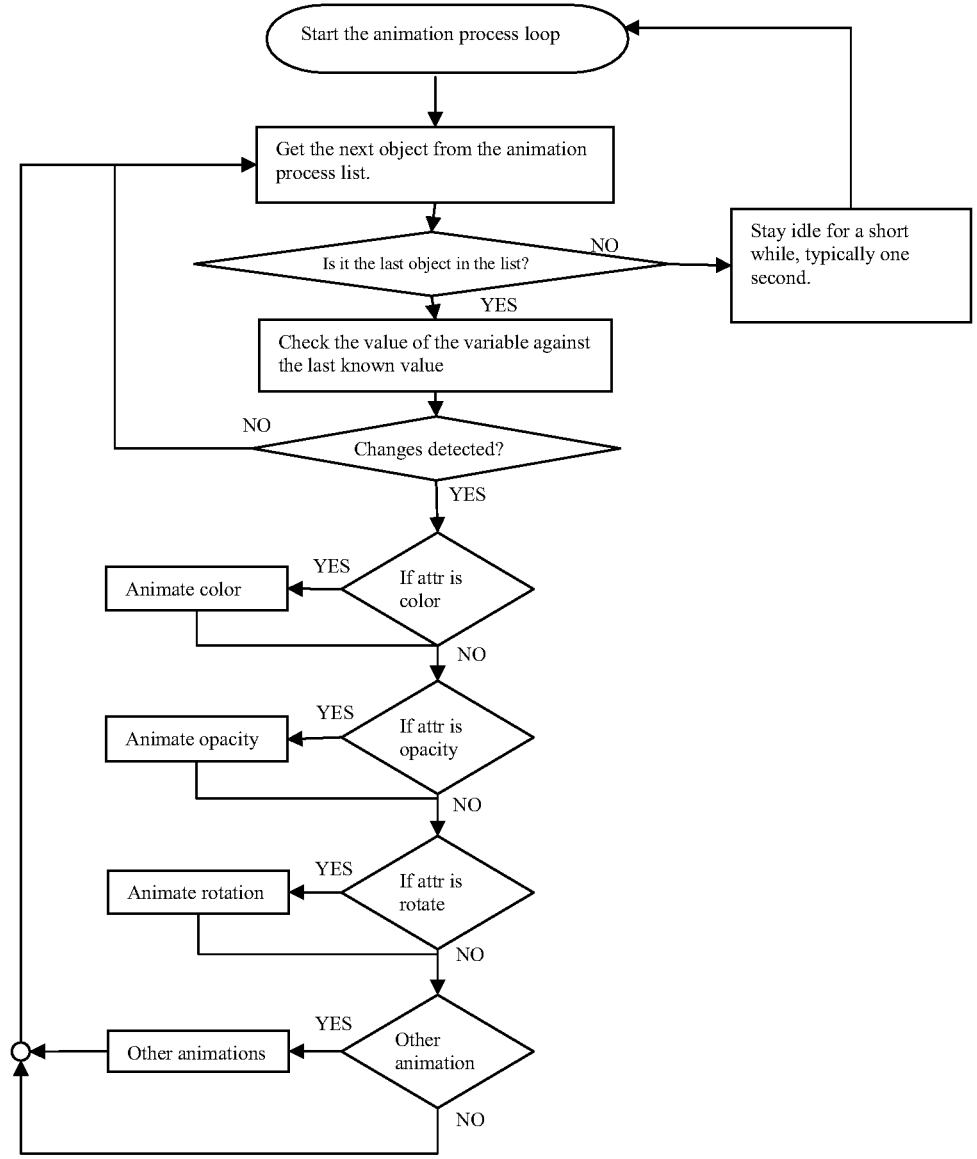

The internal functions of the animation engine working along with the browser to display and animate an object defined by a vector graphics file are further explored in FIGS. 6a and 6b, where once the browser software has been loaded, the animation engine, or (syntax) interpreter, searches for any animation instructions embedded by the user or the system integration (SI) engineer. The animation engine (or in short, interpreter) recognizes, evaluates and parses the instructions and checks for all the supported animation type. The animation engine then collects the attributes, the variables and any further information associated with the vector graphic objects to be rendered by the browser, including colors, shapes, etc. Since terms like attributes, variables, shapes and colors are terms that are well known throughout the art, they will not be discussed any further. The animation engine inspects the parameters in the instruction codes to make sure they contain all the necessary data type, and checks that there are no syntax errors in any of the inputs, and warns the user accordingly (if there is any error).

The animation engine then puts the animation instructions along with all the information of the associated vector graphic object into an animation process list. Once this is done, the engine begins the animation process loop detailed in FIG. 6b.

The animation engine starts browsing through the animation process list, inspects the value of the variable of the first vector graphics object against the last known value of the variable for the same object, and if any changes are detected, the animation engine will go into the "animation mode", whereby if the attribute associated with that object is color, the animation engine changes the color of the object accordingly. Should the attribute be opacity, the animation engine either makes the object disappear by making it transparent or make it appear on the computer monitor by increasing the opacity of the object to maximum. The process goes on and on until all the attributes associated with the object have been animated and then the animation goes back to the animation process list to look for the next vector graphic object to look for any changes in the variable associated with that object. If there is no change to the value of the associate variable, the animation engine proceeds to look for the next vector graphic object in the animation process list.

The animation loop will be terminated once the user exits the browser.

The basic format of the animation syntax consists of three (3) sections, namely Attribute (ATTR), Variable (VAR) and various Parameters (PARAM). Below is its basic structure:
{attr:ATTR, tag:VAR, param:DATn, map: [VALUE1=PARAM1, VALUEn=PARAMn]}

Items in square brackets are optional; they may or may not be required depending on the type of attribute. The number of parameters that can be accommodated is unlimited.

Attribute (ATTR) is the first section and is mandatory. This section specifies the type of animation required. For instance, COLOR, TEXT, POSITION, etc.

Variable (VAR) is the second section which specifies the variable for the graphic object to animate. VAR is optional, for instance, performing a CLONE animation does not require a VAR.

The number of VARs is not restricted to one only, the animation can be tied to several VARs by adding the logic operator in between variables. For instance, the OR operator is two pipe symbols, '||', and the AND operator is two ampersand symbols, '&&'. A pair or several pairs of brackets '( )' can be added to define the precedence of the logic operator. Below is the sample format for having multiple variables:

{attr:ATTR, tag:((VAR01||VAR02) && VAR03), PARAMn:VALUEn}

Parameter (PARAM) is the last section which specifies various animation parameters. Parameter names and number of Parameters may vary from one Attribute to another. A parameter is always separated from its value by a colon ':'. One parameter-value pair is separated from another parameter-value pair by a coma ','. In other words, one set of parameters and values always ends with a coma ','. String value that contains space character(s) could be placed in between a set of single quotes (' ') or double quotes (" "), if necessary.

In certain cases, the value of a parameter could be a series of paired data. A paired data is associated by an equal sign, and each paired data is separated by a comma ','. For instance, color animation may be written as follows:

{attr:COLOR, tag:VAR, map:[0=black, 1=brown, 2=red, 3=orange, 4=yellow]}

One complete set of animation attributes may coexist with another set of animation attributes. The same attribute can be repeated with different variables, and the number of animation sets is unlimited. The syntax is separated by semicolon ';' or comma ','. These multiple animations for a single graphic element could be written in series. In the case where there is conflict, the priority is given to either the animation set on the first or last depending on implementation. For instance, below is a series of animation on one graphic element.

{attr:COLOR, tag:VAR01, map:[10=blue, 22=green, 123=white]}; {attr:OPACITY, tag:VAR02, max:100, min:10}

The advantage of this invention is that it can greatly simplify and speed up animation work. In order to demonstrate the effectiveness of this invention, the following example is provided—the goal is to perform a simple MOV (motor operated valve) status color indication. In conventional vector graphic animation programming, the programmer would have to write the following script:

```
function updateColor( TagName)
{
    var color = 'grey';
    //get associated value from another function
    var stts = getValue( TagName);
    //predefined color indication
    switch (stts) {
        case 0:
            color = 'green';
            break;
        case 1:
            color = 'red';
            break;
        case 2:
            color = 'yellow';
            break;
        case 3:
            color = 'grey'; //gray
            break;
        default:
            color = 'black';
            stts = -1;
            break;
    }
    //process if status is valid.
    if (stts > 0) {
        //search for graphic element
        var mov = svgdoc.getElementById( TagName);
        //access the relevant portion by using DOM technique
        mov = mov.getFirstChild( );
        mov = mov.nextSibling( );
        mov = mov.nextSibling( );
        mov = mov.nextSibling( );   //this return path that desired
        //finally change the color accordingly
        mov.getStyle( ).setProperty( 'fill', color);
    }
}
```

(JavaScript® or ECMAScript is used in this example on SVG format graphic file)

Using the animation syntax to perform the equivalent animation, the programmer would only have to write:

{attr:COLOR, tag:VAR, map:[−1=black, 0=green, 1=red, 2=yellow, 3=grey, 4=black]}

Compatibility

This invention can be applied onto all types of vector graphic formats, including but not limited to Scalable Vector Graphic (SVG) format developed by W3C. SVG is a currently preferred file format because it has been promulgated by W3C and constitutes an open, non-proprietary format for which there is increasing support from browsers and browser plug-ins. However, the present invention is not restricted to SVG animation. Instead, the method of the invention can be applied to any vector graphic animation, whether text-based and/or object-based. Thus, the method can be applied to vector graphic formats other than SVG, for example, Flash (non-XML based vector graphic) as well as XAML and other XML-based vector graphic formats.

The animation instruction can be embedded into all types of graphical object as long as they are relevant, including but not limited to rectangles, squares, spheres, triangles, text objects, links, and paths.

The following is the listing of attributes, variables and parameters (in alphabetical order) that can be input into the animation instruction. The list is not comprehensive and additional attributes, variables and parameters may be added or less ones used, without departing from the scope of the present invention.

Text in the angle bracket (< >) is optional. Possible value is separated by a pipe (|) character. An asterisk (*) character in front of a value indicates default value when not specified.

Numerical values are represented by NUM1, NUM2, NUM3 and so on.

Text or string values are represented by STR1, STR2, STR3 and so on.

Constants are represented by CODE1, CODE2, CODE3 and so on.

In general, both numerical or text values are represented by DAT1, DAT2, DAT3 and so on.

An extendable scenario is described by having 'n' at the last example. For instance, after using NUM1, NUM2 and NUM3, the last example could be NUMn. This is normally used in parameters that use paired data.

Comment to the syntax could be specified by using an open quote of '/*' and closing quote of '*/', for instance, "/*this text has no effect in syntax but just to comment*/", anything between '/*' and '*/' will be ignored.

BAR:

{attr:bar, tag: var, min: NUM1, max: NUM2}

The 'bar' attribute animation is also called 'level' animation. Bar animation associates a variable value to a graphic element in the form of length, height or shape. If a variable value is less than or equal to the minimum setting, the graphic element shall retract to its minimum size, which could be a flat line. If a variable value is larger than or equal to the maximum setting, the graphic element shall extend to its fullest length, height or shape. This animation is normally needed in tank level indication.

CHECKBOX:

{attr:checkbox , tag: var<, false:NUM1|*0><, true: NUM2|*1>}

The 'checkbox' attribute animation is an ON/OFF status animation. A small square box with a tick mark or other graphical display can be drawn on the either side of a graphical object.

If the parameter 'false' and 'true' is specified, when the checkbox is checked, the value of 'tagname' will be set to what the parameter 'true' is programmed, or if it is unchecked, the value of 'tagname' will be set to the specified 'false' value.

If neither 'false' nor 'true' is specified, the value of ON status will be set to one (1) and OFF status will be set to nil (0) by default.

CLONE:

{attr: clone, map:[% n=STR1]}

The 'clone' attribute is a clone object place holder formatter. It is used in conjunction with other animations, normally used on a group of graphic elements that have some other animations. It is used to ease animation configuration and simplify maintenance work. It is most useful when one group of graphic elements needs to be duplicated several times.

Figure 8:
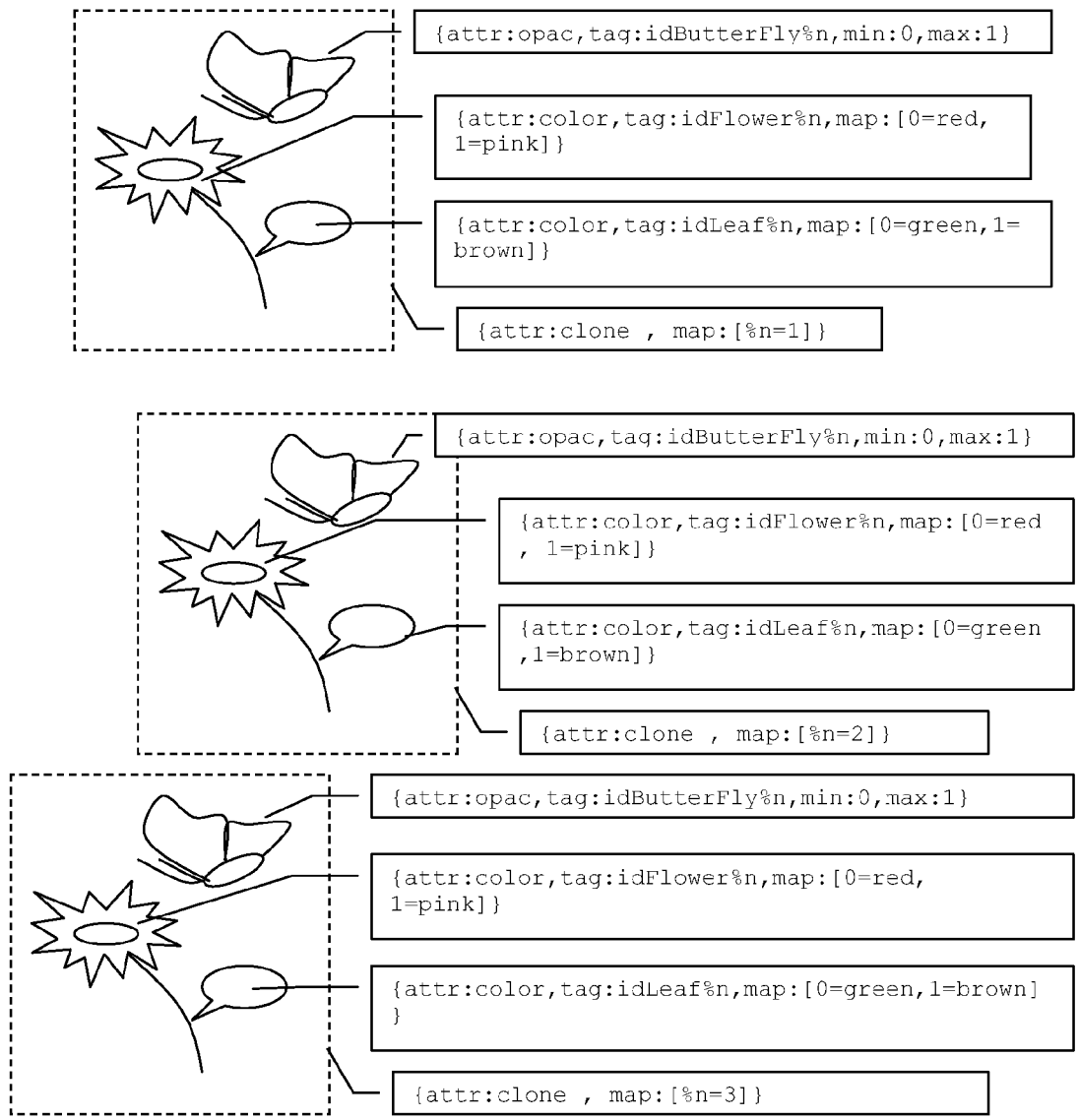
FIG. 8 illustrates the effect of a 'clone' attribute, with the 'clone' attribute being one of the many instruction codes that belongs to the syntax of an embodiment of the present invention.

An example of the use of the 'clone' attribute is illustrated in FIG. 8. In order to use this attribute efficiently, a series of variable name needs to be created consistently. For instance, two (2) sets of tags: tagA_01, tagA_02 & tagA_03, and tagB_01, tagB_02 & tagB_03, could be named as tag %1_01, tag %1_02 & tag %1_03 on relevant graphic elements in each group. The 'clone' attribute should then be applied to one group as "{attr:clone,map:[%1=A]}" and another group as "clone {[%1=B]}". By doing this, internal tag %1_01, tag %1_02 & tag %1_03 can be kept unmodified when duplicating new groups.

COLOR:

{attr: color, tag: var, map: [0=CODE1, 1=CODE2], type: *fill|stroke|both}

The 'color' attribute animation associates color to any type of graphic element to change its filled color or border color. For instance, rectangular, sphere or text. Color animation is normally used in status indication.

The color code can be any color definition based on World Wide Web Consortium (W3C) standard. For instance, it can be 'red', 'green', 'blue', 'black', 'white' and so on. Moreover, it could be specified in hexadecimal format, for instance, 0xFF00BB which represents RGB (Red, Green & Blue) values respectively.

The precedence shall be from on "larger than or equal to" basis. This means if a variable value falls within two pairs of color code, the smaller pair of color code will be taken into effect. And if the variable value is larger than the largest color code's setting, the largest color code will be used. However, if the variable value is smaller than the smallest color code, the smallest color code will be used.

The following example describes the above scenarios.

{attr:Color, tag: var, map:[10=green, 20=yellow, 40=orange, 80=red]}

If the value of variable 'tag' is 150, which is larger than 80, 'red' will be chosen.

If the value is 50, which is larger than 40 and smaller than 80, 'orange' will be chosen.

If the value is 20, which is equal to 20, 'yellow' will be chosen.

If the value is 15, which is larger than 10 and smaller than 20, 'green' will be chosen.

If the value is −5, which is smaller than 10, then 'green' will also be chosen.

DEBUG:

{attr:debug, tag: var}

When the associated variable is ON, or is valid but not equal to zero, then the debugging information will be displayed to assist programmer to troubleshoot and maintain the work. The debugging information could include, though is not limited to, the number of animations, highlighting the animated object, having the animated variable displayed and so on.

DRAG:

{attr:drag, tag: var, param:[DAT1,DAT2,DATn], dst: [STR1,STR2,STRn]}

The 'drag' attribute is used in conjunction with 'drop' attribute on another destination graphic element. When a first graphic element is dropped on a second graphic element, the value of the variable will be passed from the first to the second, if the variable does not have valid data, the data in parameter 'param' will be used. If a destination parameter 'dst' is specified, then only those second graphic elements that carried with the listed name can be dropped. Otherwise it is free to drop on any destination (another graphic element) that carried 'drop' attribute.

DROP:

{attr:drop, tag: var}

The 'drop' attribute works in conjunction with 'drag' attribute. Any graphic element that carries 'drop' attribute shall be named after the period in the syntax. And it was expected that a function with the same name in a script/logic/program is written when a graphic element is dropped on it. And the data received will be passed on to the function.

DROPDOWN:

{attr:dropdown, tag: var, pair:[STR1=DAT1, STR2=DAT2, STRn=DATn]}

The 'dropdown' attribute or combo box attribute allows a list of options to pull down just like a menu. The parameter is a paired data, whereby the string/text entered will be listed according to the sequence, when the option is clicked, the associated data, number or string will be set into the specified variable.

FRAME:

frame.name{[pair:] 1=STR1, 2=STR2, 3=STR3, n=STRn [fit:*yes/no]}{attr:frame, tag: var, pair:[1=STR1, 2=STR2, 3=STR3, n=STRn]<, fit:*yes/no>}

'frame' attribute animation allows one or more graphic element to be displayed in one container or canvas. The 'container' or 'canvas' can be just another graphic element. The graphic elements to be called could be external graphics files like PNG, JPG, GIF, etc.

The associated name with the numerical value of the variable could be a name or ID of a series of graphic elements which may form a sequence of movement of action. This animation is used to achieve complex graphic movement or changing of shape.

The 'fit' parameter shall shrink or expand the sub-graphic element to be fitted into the canvas graphic element which attached with 'frame' attribute.

FUNCTION:

{attr: func<tion>, name: STR<, param: [DAT1, DAT2, DATn]><, effect:*shadow|button>}

When a 'function' attribute is activated, it shall execute a script, program or logic, which is named as variable. The 'function' attribute can be applied to any clickable graphic element.

Function parameters or function argument, can be supplied by using 'param' parameter.

There are two possible types of effect for this animation. The default type is shadowed, which mean the object shall display with shadow when a computer mouse is over the object to indicate that a sequence will be activated if clicked. If 'button' type is specified, the graphic element shall be shaped with button look to indicate to user that it is clickable.

GET:

{attr: get, tag: var<, align: *right|left|center><, format: ##<.####<EX##>>><, type:*good|live>}

The 'get' attribute can only be used on 'text' type of graphic element. It shall fetch the value of the specified tag and display on the text where it placed. It is aligned to right if not specified in the 'align' parameter.

The 'format' parameter shall control the appearance of numerical format, be it integer, floating point or exponential format. Specifying the hash (#) character without period (.) shall show a number without the decimal value regardless of its type. If a period (.) is specified, then the number of hash (#) characters after the period shall indicate number of decimal after the period (.). If an 'EX' if specified after the period (.), then exponential format will be used.

The number of hash (#) characters before the period (.) and after the 'EX' shall not play any role in controlling the format but is more for indication, since this format can be directly specified onto text itself as the graphic element.

The 'type' parameter is to check the validity of the value fetched. If 'good' is specified then only the last good value will be display; if 'live' is specified, depending on the implemented system, any value including but not limited to NULL or UNDEFINED might be shown.

MOVE:

{attr:move, tag: var, path:STR, <duration:*1|NUM>, <repeat:*infinite|NUM>, <stop:*appear|disappear>}

The 'move' attribute shall allow a graphic element to move along the specified path, which is specified as a parameter. The duration shall indicate how long the graphic element takes to travel along the specified path in seconds; the default time is one (1) second. The 'repeat' parameter indicates how many times the movement shall be repeated. The default value is 'infinite'. The 'stop' parameter specifies the behavior of the graphic element at the end of the movement, which could be stay or gone.

OPACITY:

{attr:opac, tag: var, max:NUM1 , min:NUM2 , type: *relative|absolute}

The 'opacity' attribute allows a graphic element to look transparent or partially transparent. It basically controls the level of transparency of a graphic element.

When the associated variable value is less than or equal to the minimum setting, the object will disappear; when the variable value is more than or equal to the maximum setting, it will appear solid. However, if the variable value is in between the two parameters, it will appear partially transparent. The level of transparency is proportional to the maximum and minimum scale.

The 'type' parameter shall specify whether the transparency shall be relative to the existing graphic element's opacity, or being absolute and overwrite the existing graphic element's opacity.

OPEN:

{attr:open , tag: var , src:STR<, type:*current|new><, x:*100|NUM1><, y:*100|NUM2><, width:*100|NUM3><, height:*100|NUM4><, effect:*shadow|button>}

When 'open' attribute is activated on one graphic element, most of the time being clicked by user, another screen/content which is specified in 'src' parameter will be shown.

If 'new' is specified in parameter 'type', it shall pop up a window with the coordinate parameters and with another content for further control.

POSITION:

{attr:pos , x:tagx , y:tagy<, type:*relative|absolute>}

The 'position' attribute is used to control the desired displayed location for a graphic element. Two variables shall be used as compared to one with most of the other animation attributes. One is associated with x-axis and another one is associated with y-axis.

The 'type' attribute shall indicate that the position shall be relative to the original position or based on operating system absolute position.

RADIO:

{attr:radio , tag: var , param:DAT}

The 'radio' attribute creates the effect of a radio button, which means only one exclusive graphic element can be selected at any one time. It is normally used on text, and a radio button can be drawn manually or automatically during runtime. All graphic elements that carry the same variable name are considered being grouped as one. The data specified in the parameter 'param' will be set into the variable when selected. However, when it is de-selected, the value will be set to nil (0). Also, the radio indication will be highlighted according to the associated variable when the value changes.

ROTATE:

{attr:rotate , tag: var<, max:*100|NUM1><, min: *0|NUM2><, center: *center|top|bottom|left|right|topleft|topright| bottomleft|bottomright><, x:NUM3><, y:NUM4>}

The 'rotate' attribute allows a graphic element to rotate in 360 degrees, or to spin in any direction. It shall rotate proportionally to the maximum and minimum parameters' scale when the variable changes.

For instance, when the associated variable is equal to the minimum or maximum setting, the graphic element shall appear without any rotation, namely 0° & 360° respectively. When it is one quarter of the scale, it shall appear rotated 90°.

Center of the rotation can be specified by having 'center' parameter. If the predefined center of rotation is not sufficient to control the rotation, 'x & y' parameters can be used to have greater control. The 'x & y' parameter will always overrule 'center' parameter when supplied. If only one of 'x & y' is supplied, which is invalid, the 'center' parameter will be used.

SET:

{attr:set, tag: var<, align:*right|left|center><, src: STR1><, type:*data|var><, effect:*shadow|outline|hand><, prompt:STR2>}

The 'set' attribute can be used on any type of graphic element. When this animation is activated, a mechanism, for instance a pop up window with 'OK & Cancel' option, shall allow a user to enter a value to save into the specified variable.

The 'align' parameter specifies how the text shall be aligned if text type of graphic element is used; otherwise it has no effect.

For any type of graphic element other than text, the 'src' parameter specifies the source value to be set into the associated variable. If the 'type' parameter is specified as 'var' then the 'src' parameter is treated as variable, and the source variable's value will be fetched and set into the associated variable.

If parameter 'prompt' is specified, a pop up with the supplied text will pop up with 'Yes & No' button. It is like an 'Are you sure?' dialog box, to get end user confirmation before a value is set into the associated variable.

The 'effect' parameter specifies the indication/highlight method to hint to an end user when the computer mouse is over a graphic element for which the text/variable can be changed.

SIZE:

{attr:size , tag: var<, x: *center|NUM1><, y:*center|NUM2>}

The 'size' attribute allows a graphic element to scale its size according to the variable value. For instance, a value of two (2) shall make a graphic element double its size; conversely, a value of half (0.5) shall halve the object size.

The 'x & y' parameter shall determine the center of the sizing. For instance, if the position is at the centre of the graphic element, then the object shall remain in the middle regardless of the size. If the position is specified at middle bottom, then the bottom edge of the object shall never exceed the specified position, and the size shall grow or shrink left, right and up, down.

SLIDER:

{attr:slider , tag: var, max:NUM1 , min:NUM2 <, major:*10|NUM3><, minor*1|NUM4>}

The 'slider' attribute provides a means of control to the user so that a value can be set by dragging a button/indicator on a bar by using computer mouse or arrow key. The specified variable will be set or associated by the position of the slider indicator. The association of the variable value and the slider is scaled according to the 'max' and 'min' parameter. The 'major' and 'minor' parameters specify the marking on the slider. The 'minor' parameter also plays a role in specifying how much the slider should advance or move backward when the up or down button is clicked, or arrow key is pressed, whilst 'major' is linked to the Page Up & Page Down key.

SOUND:

{attr:sound , tag: var , pair:[NUM1=STR1,NUM2=STR2, NUMn=STRn]<, repeat:*1|NUM|infinite>}

The 'sound' attribute allows a recorded sound file to be played when the variable value matches the supplied parameter.

SPIN:

{attr:spin , tag: var , max:NUM1 , min:NUM2 <, major:*10|NUM3><, minor:*1|NUM4>}

The 'spin' attribute is almost the same as 'slider' attribute, but instead of having a sliding bar, it provides up & down button to increase or decrease the associate variable by using computer mouse or arrow key. The 'minor' parameter also play a role on specifying how much 'spin' should increase or decrease when arrow key is pressed, whilst 'major' is linked to the Page Up & Page Down key.

TEXT:

{attr:text , tag: var , pair:[NUM1=STR1 , NUM2=STR2 , NUMn=STRn]}

The 'text' attribute is only applicable to text types of graphic element. The displayed text shall change according to the variable with associated values.

TIP:

{attr:tip <, tag: var>, param:STR}

The 'tip' attribute allows a message (or tool tip) to display temporarily while computer mouse is over one graphic element. The source of the message can come from the variable value, or from fixed text message. When two of them are present, the variable's value shall have higher priority and will be displayed, if the value is more than or equal to one character, but if the variable value is invalid, then the fixed message will be displayed, which acts as the default value.

The 'tip' attribute is normally used when the programmer wishes to give more hint to the user of the usage of a button, item or any graphic element, when the computer mouse is over the graphic element.

CHART:

{attr:chart , tag: var , pair:[TAG1=CODE1, TAG2=CODE2,TAGn=CODEn]<, x-axis:*time|TAG>, y-axis:[STR1,STR2,STRn], y-max:[NUM1,NUM2,NUMn], y=min:[NUM3,NUM4,NUMm]}

The 'chart' attribute draws mathematical graph on to a rectangular. When time is used as 'x-axis' parameter, it works as a trending. The number of data supplied to parameter 'y-axis', 'y-max' & 'y-min' shall be equal.

WIDTH:

{attr:width , tag: var}

The 'width' attribute associates the variable value to the graphic element's stroke or border's width.

For the reader's convenience, the following basic glossary is provided.

Glossary

DOM: Document Object Model.

GIF: One type of computer non-vector graphic format.

GUI: Graphic User Interface.

HMI: Human Machine Interface, also referred to as Man Machine Interface.

JPG: One type of computer non-vector graphic format.

Mouse: Computer mouse, or any other computer pointing device.

PNG: One type of computer non-vector graphic format developed by W3C.

SCADA: Supervisory Control And Data Acquisition.

Script: Computer program or logic.

Syntax: A consistent format that can be understood and executed by computer.

SVG: Scalable Vector Graphic (SVG).

Tag: Variable.

Variable: A name that refers to a storage unit in the computer memory that could hold a value.

Vector graphic: Computer graphic that is rendered via mathematical definition.

W3C: World Wide Web Consortium.

XML: Extensible Markup Language (XML).

Abbreviations

Attr: Attribute.

Dst: destination.

Max: Maximum.

Min: Minimum.

Num: Number.

Param: parameter.

Src: source.
Str: String of text.
Var: variable.

Summarizing, embodiments of the present invention provide:
1. a simple syntax (no coding required)
2. that ties any vector graphical object (text, shape, etc.) in any vector graphic format (SVG, VRML, etc.)
3. to one or more animation effects (motion, color, transparency, size, position, etc.)
4. based on the value of a data source (a variable name)
5. and a set of criteria and/or conditions cited in the syntax (item 1 above).

The syntax is:
1. in a simple and consistent format
2. that completely describes how the animation should be executed
3. with description of one or multiple sets of commands which describe the attribute(s)/effect(s) to animate, the name of the variable whose value determines how to animate the object, the criteria/conditions to animate the object
4. with no programming knowledge or programming being required to write the syntax, and to perform the animation.

The animation is:
1. executed
2. by an animation engine developed specifically for this syntax,
3. and the engine runs in the background
4. to retrieve the current value of the data source/variable (item 2 of the first list above)
5. then checks the value retrieved against the criteria/conditions (item 4 of the first list above)
6. and execute the animation accordingly
7. by either manipulating the graphical object's object model or object properties (for example, SVG object's DOM (document object model), etc.)
8. using any programming language (for example, JavaScript®) supported by the application (such as an internet browser) used to display the graphical objects.

Therefore, it is obvious from the description that a simple, less-time consuming, more straightforward method of programming the animation of vector graphics objects can be achieved without the need of the skills of a specialized programmer.

Although the above description has described the invention when used primarily in the animation of objects in the Human Machine Interface (HMI) of a SCADA system, the same invention can easily be adapted for use in other monitoring systems and interfaces such as PDA screens or cellular phone displays.

In the above embodiments, the programmer inputs the animation instruction codes manually into the vector graphics file, for example using a text editor. It would also be possible and within the scope of the present inventor to compile a software with a user-friendly graphical interface to provide some form of "drag-and-drop" or "click-to-animate" function to the programmer, so that items such as the type of animation for a vector graphic object can be selected with a mouse click. The software will then automatically generate and insert the required set of the animation instructions into the file. This will completely remove the necessity of manually inputting any instruction codes, and so further simplify the method of authoring the animation of the vector graphic objects.

It is understood that the invention may be embodied in numerous other ways than those specifically described and illustrated herein without departing from the spirit and scope of the invention.

As an example of the source code of an animation engine using JavaScript® is as listed below and on the following pages, in accordance with one embodiment of the invention.

```
var $S='inkscape:label';var $T="http://www.w3.org/
2000/svg";var $U="http://www.w3.org/1999/xlink";var $
V=4;var $W=null;var $X=null;var $Y=true;var $Z=null;var
$00=null;try{var svr=new tagPool( );}catch(e){alert(e)}; var
$01=new Object;var $02=0;var $03=0;var FIT_ NONE=0;
var FIT_WIDTH=1;var FIT_HEIGHT=2;var FIT_
BOTH=3;var FIT_STRETCH=4;var $04=FIT_BOTH;
$a( );function $a( ){window.attachEvent("onload",$b);}
function $b( ){svr.set('timer1',0);
try{$W=document.idsvg.getSVG Document( );}catch(e){ }
if($W){$X=$W.documentElement;$d( );$N( );$P( );$Q( );
$c( );$f($X);doWork( );$c( );}}var $05="scale(1, 1)";function $c($06){if(null !=$06){$04=$06;}var $07=$X.getAttribute('width');var $08=$X.getAttribute('height');var
$09=document.body.scrollHeight;var
$0a=document.body.scrollWidth;var $0b=1;var $0c=1;var
$0d=0.99;$0b=$0a/$07*$0d;$0c=$09/$08*$0d;switch($04)
{case FIT_NONE:$0b=1;$0c=1;case FIT_WIDTH:
$0c=$0b;break;case FIT_HEIGHT:$0b=$0c;break;case
FIT_STRETCH:break;case FIT_BOTH default:if($0b>$0c)
{$0b=$0c;}else{$0c=$0b;}break;}$05='scale('+$0b+','+
$0c+')';$e($X.firstChild);}function $d( )
{window.onresize=function( ){$c( );};}function $e($0e){if
($0e){if("g"==$0e.nodeName){$0e.setAttribute('transform',$05);}if($0e.next Sibling){$e($0e.nextSibling);}}}
function $f($0e){if(!$0e)return;$g($0e,$0e.nodeName);if
(null !=$0e&&$0e.hasChildNodes( )){for(var
$0f=$0e.firstChild;$0f;$0f=$0f.nextSibling){$f($0f);}}}var
$0g=0;function doWork( ){for(var h in $01){var $0h=false;
var g=$01[h]['tag'];if($01[h]['tag'].indexOf('||')>-1){if
(parseFloat($R(g))!=$01[h]['oldData']){$01[h]['oldData']=parseFloat($R(g));$0h=tr ue;}}else if($01[h]['tag'].
indexOf('&&')>-1){if(parseFloat($R(g))!=$01[h]['oldData']){$01[h]['oldData']=parseFloat($R(g));$0h=tr
ue;}}else{if(svr.get(g)!=$01[h]['oldData']){$01[h]['oldData']=svr.get(g);$ 0h=true;}}var $0i=0;if($0h){$0i++;
switch($01[h].attr){case 'color':$j($01[h]);case 'text':case
'opac':$q($01[h]);break;case 'pos':break;case 'image':
break;case 'rotate':$k($01[h]);break;case 'bar':$o($01[h]);
break;case 'get':$p($01[h]);break;case 'set':break;case
'func':break;default:break;}}}if($02!=$0g){$02=$0g;if
(svr.get('timer1')==0){svr.set('time r1',1);svr.set('-
timer1'0);}else if(svr.get('timer1')==1){svr.set('timer1',0);
svr.set('-timer1',1);}if($03!=2){$03++;svr.set('timer2',
0);svr.set('-timer2',1);}else if($03==2){$03=0;svr.set
('timer2',1);svr.set('-timer2',0);}}}window.status=('work
list: '+$0i+'work_ctr: '+$0g++);window.setTimeout
('doWork( )',1000);}var $0j=1;function $g($0e,$0k){var
$0l=null;try{$0l=$0e.getAttribute($S);}catch(e){return;}
$0l=$h($0l);var $0m=$0.split(";");var $0n=false;var $0o='';
for(var i in $0m){if($0m[i].length>$V){try{eval('var o='+
$0m[i]+';');if(o.attr){o['obj']=$0e;var $0p=o.attr;
o.attr=$0p.toLowerCase( );switch(o.attr){case 'color':if(!o
['map']){$0o='Expected [map]defination';$0n=true;}if(!o
['tag']){$0o='Expected [tag]defination';$0n=true;}if
('none'!=o['obj'].getStyle( ).getPropertyValue('fill')){o
['target']='fill';}else if('none'!=o['obj'].getStyle( ).
getPropertyValue('stroke')){o['target']='stroke';}
else{$0n=tr ue;}break;case 'clone':$Z=o.map;break;case
'bar':var $0q={height:$0e.getAttribute('height'),y:
```

$0e.getAttribute('y')};o['runtime']=$0q;break;case 'get':if('left'!=o.align){var $0r=$0e.firstChild.getComputedTextLength( );var $0s='end';if('center'==o['align']){$0r/=2;$0s='middle';} var x=$0e.firstChild.getAttribute('x');var $0t=parseFloat(x)+$0r;$0e.firstChild.setAttribute('x',$0t);$0e.firstChild.setAttribute('te xt-anchor',$0s);}break;case 'set':$z(o);break;case 'popup':try{$0e.addEventListener('mouseup',new $u(o['name'],o['tag']),false);}catch(e){alert('add popup event error: '+e.description);}default:break;}o['max']= parseFloat(o.max);o['min']=parseFloat(o.min) ; var $0u=new Object;$0u[o.tag]=svr.get(o.tag);o['tags']=$0u;if(!$0n){$01[$0j++]=o;}else{alert('PRO GRAMMER WARNING:\n\n'+'Incomplete/invalid syntax found for graphic object with ID: ['+o['obj'].getAttribute('id')+'] \n\n'+'Error message: '+$0o+'\n\n'+'This item will be highlighted with RED shadow.'+'\n');try{o['obj'].getStyle( ).setProperty('filter','url(#Error_Shadow)');} catch(e){ };}}}catch(e){ }}}function $h($0v){$0l=$0v;$0l=$0l.replace(/,\s*\}/g,'\}');$0l=$0l.replace(/\s*\{\s*/g, '{'); $0l=$0l.repl ace(/\s*\}\s*/g,'}');$0l=$0l.replace(/\s*\ [\s*/g,'[');$0l=$0l.replace(/\s*\]\s*/g,']');$0l=$0l.re place(/\s*:\s*/g,':');$0l=$0l.replace(/\s*,\s*/g,',');$0l=$0l.replace (/\{/g,'{\"');$0l=$0l.repla ce(/\}/g,'\"}');$0l=$0l.replace(/\[/g,'[\"');$0l=$0l.replace(/\]/g,'\"]');$0l=$0l.replace (/:/g,'\":\"');$0l=$0l.replace(/,/g'\",\"');$0l=$0l.replace(/\] [\s]*"\}/g, ']}');$0l=$0l.replace(/\][\s]*"/g,'],');$0l=$0l.replace(/:$^3$ /[\s]*\[/g,':[');if($0l.search(/%/)>–1&&null!=$Z){for(var i in $Z){var $0w=$Z[i].split('='); re=new RegExp($0w[0],'g');if('%'==$0w[0].charAt(0)) {$0l=$0l.replace(re,$0w[1]);}}}return $0l;}function $i($0x){var $0y=null;var t=$0x['tag'];if((t.indexOf("||")>–1)||(t.indexOf("&&")>–1)){ }else{$0y=svr.get(t);}}$0z=0; function $j($0x){var $0y=null;var t=$0x['tag'];if((t.indexOf("||")>–1)||(t.indexOf("&&")>–1)){$0y=parseFloat($R(t));}else{$0y=svr.get(t);}var $0A=$0x['map'];for(var i=$0A.length-1;i>–1;i–){ $0B=$0A[i].split('=',2);if($0y>=parseFloat($0B[0])||(i==0&&$0y<parseFloat($0B[0])))){v ar $0C='';if($0B[1].search('blink.')>-1){var $0q=$0B[1];$0q=$0q.split('.');$0C=$0q[1];if($0C.indexOf('/')>-1){var $0D='/';$0C=$0C.replace($0D,';');} else{$0C+='; none';}try{$0x.obj.removeChild($0x.obj.firstChild( ));}catch(e){ }var $0E=$W.createElement('animateColor');$0E.setAttribute('attributeName',$0x['target']) ;$0E.setAttribute('values',$0C);$0E.setAttribute('calcMode','discrete');$0E.setAttribute ('dur','1s');$0E.setAttribute('begin','0s');$0E.setAttribute('repeatDur','indefinite');$0x.ob j.appendChild($0E);}else{try{for(var $0F=$0x.obj.firstChild( );$0F;$0F=$0F.nextSibling) {$0x.obj.removeChild($0F);}}catch( e){$0z++;window.status=("addAttrColor-can't remove child; attempt: "+$0z+ 'with err: '+e.description);}$0C=$0B[1];}if('ignore'!=$0C) {$0x.obj.getStyle( ).setProperty($0x['tar get'],$0C);} break;}}}function $k($0x){var $0G=50;var $0y=null;var t=$0x['tag'];if((t.indexOf("||")>–1)||(t.indexOf("&&")>–1)){ }else{$0y=parseFloat(svr.get(t));}if($0y<$0x['min']) {$0G=0;}else if($0y>$0x['max']){$0G=100;} else{$0G=parseFloat(($0y-$0x['min'])*100/($0x['max']-$0x['min']));}$0G*=360/100;if(!isNaN($0G)){var $0H=$0x.obj.getBBox( );var rx=$0H.x+$0H.width/2;var ry=$0H.y+$0H.height/2;var $0l=$0x.obj.getAttribute('transform');var pos=$0l.search('rotate');if(pos>-1) {$0l=$0l.substr(0,pos);}$0l+='rotate('+$0G+','+rx+', '+ry+')';$0x.obj.setAttribute('transform',$0l);}}function $l($0e,$0v,Id,$0J){ }function $m($0x){ }function $n($0x) {var $0l=$0x.getAttribute($S);var $0m=$0l.split(";");var $0A=null;var $0l=null;var $0K=null;if(true==$0x.obj.hasAttribute('transform')) {$0l=$0x.obj.getAttribute('transfor m');$0K=$l($0l,'translate');if(null !=$0K){$0A=$0K.split(',');}}var x=null;var y=null;if(null !=$0x.tagx){x=svr.get($0x.tagx);}else if(null != $0A&&$0A.length>1){x=$0A[0];} if(null !=$0x.tagy){y=svr.get($0x.tagy);}else if(null !=$0A&&$0A.length>1){y=$0A[1];}if(!isNaN(x)&&!isNaN(y)){var $0H=$0x.obj.getBBox( );x-= $0H.x;y-= $0H.y;$0l='transate('+x+','+y+')';$0x.obj.setAttribute('transform',$0l);}}function $o($0x){var $0y=null;var t=$0x['tag'];if((t.indexOf("||")>–1)||(t.indexOf("&&")>–1)){ } else{$0y=svr.get(t);}var $0G=50;if($0y<$0x['min']){$0G=0;}else if($0y>$0x['max']) {$0G=100;} else{$0G=parseFloat(($0y-$0x['min'])*100/($0x['max']-$0x['min']));}var $0r=$0G/100*$0x['runtime']['height'];if(!isNaN($0r)){$0x.obj.setAttribute('height',$0r);}var pos=0;pos=parseFloat($0x.runtime.y);pos+=($0x.runtime. height-$0r);if(!isNaN(pos)) {$0x.obj.setAttributeNS(null,'y',pos);}}function $p($0x) {var $0y=null;var t=$0x['tag'];if((t.indexOf("||")>–1)|| (t.indexOf("&&")>–1)){ } else{$0y=parseFloat(svr.get(t)); } $0x.obj.firstChild.firstChild.setData($0y);} functio n $q($0x){var $0y=null;var t=$0x['tag'];if((t.indexOf("||")>–1)||(t.indexOf("&&")>–1)){$0y=parseFloat($R(t)); }else{$0y=svr.get(t);}var $0G=50;if (null==$0y||undefined==$0y){$0y=0;}if($0y<$0x['min']) {$0G=($0x['max']>$0x['min'])?0:100;}else if($0y>$0x['max']){$0G=($0x['max']>$0x['min'])?100:0;} else{$0G=parseFloat(($0y-$0x['min'])*100/($0x['max']-$0x['min']));}if(!isNaN($0G)){if($0G<=0){$0x.obj.getStyle( ).setProperty('display','none'); window.status='display none';}else{$0x.obj.getStyle( ).setProperty('display','normal');$0x.obj.getStyle( ).setProperty('opacity',Math.abs($0G/100));}}}function $r($0L) {this.TagName=$0L;}var $0M=null; $r.prototype.handleEvent=function(evt){var $0N=new Array(3);$0N[0]=this.TagName;$0N[1]=window;var $0O="font-size:12px;dialogTop:250;dialogLeft:399;dialog-Width:18em;dialogHeight:10em;help:n o;status:no;edge:sunken;";if(null==$0M||$0M.closed) {$0M=showModelessDialog('./sy stem/prompt.htm',$0N,$0O);}};var $0P=new Object;var $0Q=new Object;function $s($0L,Id,$0R){$0P[Id]=$0L;$0Q[Id]=$0R;}function $t( ) {var obj=null;var $0y=null;for(var h in $0P) {try{obj=$W.getElementById(h);$0y=svr.get($0P[h],null , $0Q[h]);obj.firstChild.first Child.setData($0y);}catch(e) {window.status=('monitor tag: '+h+'\n'+e.description);alert ('system error, chk sfts bar');}}}function $u($0S,$0T) {this.FileName=$0S;this.TagList=$0T; }$u.prototype.handleEvent=functio n(evt){var $0N=new Array(3);$0N[0]=window;$0N[1]=this.TagList;var $0O="font-size:12px;dialogWidth:38em;dialogHeight: 30em;help:no;status:no;edge:sunken;";if(nu ll==$0M||$0M.closed){$0M=showModelessDialog('./'+this.FileName+'.htm',$0N,$0O );}};function $v($0e,$0v){var $0U=$H($0v,'zoom');var $0V=$K($0v,'zoom');if(!$0V) {$0V='_zoom';}var $0W='!'+$0V;svr.set($0V,0);svr.set ($0W,1);if(null !=$0U){var $0X=$M($0U,'align');var bb=$0e.getBBox( );var w=$X.getAttribute('width');;var h=$X.getAttribute('height');var $0K=null;var $0Y=null;var $0l=null;var $0Z=1;switch($0X){case 'center':case 'centre':default:$0Z=(bb.width>bb.height)?w/bb.width: h/bb.height;$0Y=$0Z+','+$0Z;$0K=(w/2–(bb.x+bb.width/2)*$0Z)+','+(h/2–(bb.y+bb.height/2)*$0Z);break;case 'left': $0Z=h/bb.height;$0Y=$0Z+','+$0Z;$0K=(–bb.x*$0Z)+','+ (–bb.y*$0Z);break;case 'right':$0Z=h/bb.height;$0Y= $0Z+','+$0Z;$0K=(w–(bb.x+bb.width)*$0Z)+','+– bb.y*$0Z;break;case 'top':$0Z=w/bb.width;$0Y=$0Z+','+ $0Z;

$0K=-bb.x*$0Z+',' +-bb.y*$0Z;break;case 'bottom':$0Z=w/bb.width;$0Y=$0Z+',' +$0Z;$0K=-bb.x*$0Z+',' +(h-(bb.y+bb.height)*$0Z);break;}try{$0l='translate('+$0K+')'+'scale('+$0Y+')';$0e.addEventListener('mouseup',new $x($0e,$0l,$0V),false);$0e.addEventListener('doubleclick',new $w(),false);}catch(e){alert('caught: '+e.description);}}}function $w(){ }$w.prototype.handleEvent=function(evt){alert('two event');};function $x($0e,$10,$11){this.Obj=$0e;this.Xform=$05+$10;this.Tagname=$11;}$x.prototype.handleEvent=function(evt){$05=this.Xform;$e($X.firstChild);var $0W='!'+this.Tagname;svr.set(this.Tagname,1);svr.set($0W,0);if('g'!=this.Obj.nodeName){this.Obj.getStyle().setProperty('display','none');}};function $y($0e,$0v){var $12=$K($0v,'func');var $0U=$H($0v,'func');if($12){var param=$M($0U,'param');if($Z){if(param&¶m.search(/%/)>-1){for(var i in $Z){var $0w=$Z[i].split('=');var re=new RegExp($0w[0],'g');if('%'==$0w[0].charAt(0)){param=param.replace(re,$0w[1]);}}}}els e{param=" ";}var $13=""+"try{"+$12+"("+param+")}"+"catch(e){"+"alert('"+'FUNCTION ANIMATION ERROR: '+'\\n\\n'+'Please ensure function name: *'+$12+'*'+'can be found in script file'+'\\n'+'Check the following message for troblesshooting hint: '+'\\n\\n'+'"+"+e.description'+");}";var $14=$M($0U,'type');if('button'==$14){var $15=$0e;var $16=$15.getBBox();var $0K='translate('+$16.x+''+$1 6.y+')';var $0Y='scale('+($16.width/100)+'';$0Y+=($16.height/100)+')';var $0l=($00?$00:'')+$0K+$0Y;$15.setAttribute('display','none');var $17=$W.createElement('g');var $18=$W.createElement('use');$18.setAttributeNS($U,'xlink:href',"#idDefsBttnUp");$1 8.setAttribute('transform',$0l);$17.setAttribute('id','idTempEvt');$17.appendChild($18) ;$X.appendChild($17);$17.addEventListener('mouseout',$B,false);$17.addEventListener('mousedown',$C,false);$17.addEventListener('mouseup',$B,false);$17.setAttributeNS(null,'onclick',$13);}else{$0e.setAttributeNS(null,'onclick',$13);$0e.addEventListener('mouseover',$F,false);$0e.addEventListener('mouseout',$G,false);}}}function $z($19){var tag=$19.tag;var $0U='';if(null !=tag){var id=$19.obj.getAttribute('id');var $1a=$19.obj.getBBox();var $17=$W.createElement('g');var $1b=$W.createElement('rect');$1b.setAttribute('id',('rect~'+id));$1b.setAttribute('x',$1a.x-3);$1b.setAttribute('y',$1a.y-3);$1b.setAttribute('height',$1a.height+6);$1b.setAttribute('width',$1a.width+6);$1b.setAttribute('style',"fill:gray;fill-opacity:0.1");var $0l=$19.obj.getAttribute('transform');if(null !=$0l){$1b.setAttribute('transform',$0l);}$17.appendChild($1b);$X.appendChild($17);t ry{$1b.addEventListener('mouseup',new $r(tag),false);$1b.addEventListener('mouseover',$F,false);$1b.addEventListener('mo useout',$G,false);}catch(e){alert('add event error: '+e.description);}}}function $A($0e,$1c){var $0l=$0e.getAttribute($S);var $1d=$1c?'set':'get';var tag=$K($0l,$1d);var $0U=$H($0l,$1d);if(null !=tag){var id=$0e.getAttribute('id');if(true==$Y){var $1e=$0e.firstChild.firstChild.nodeValue;var pos=$1e.indexOf('.');var $1f=null;if(pos>0){$1f=$1e.length-pos-1;var $1g=((pos-4)==$1e.indexOf(',',(pos-4)))?true:false;}$s(tag,id,$1f);}var $0X=$M($0U ,'align');if('left'!=$0X){var $0r=$0e.firstChild.getComputedTextLength();var $0s='end';if('center'==$0X){$0r/=2;$0s='middle';}var x=$0e.firstChild.getAttribute('x');var $0t=parseFloat(x)+$0r;$0e.firstChild.setAttribute('x',$0t);$0e.firstChild .setAttribute('te xt-anchor',$0s);}}}function $B(evt){var obj=evt.getTarget( );obj.setAttributeNS($U,'xlink:href',"#idDefsBttnUp");}function $C(evt){var obj=evt.get Target( );obj.setAttributeNS($U,'xlink:href',"#idDefsBttnDn");}function $D(evt){window.status=('over');}function $E(evt){window.status=('up');}function $F(evt){try{evt.getTarget( ).getStyle( ).setProperty('filter','url (#Drop_Shadow)');}catch(e ){alert ('over:'+e . description)}} function $G(evt){try{evt.getTarget( ).getStyle( ). setProperty('filter','none');} catch(e){alert('out:'+e. description)}}function $H($0v,$1h,$1i){var $1j=null;var tag=null;if(null !=$0v){if(!$1i){$0v.toLowerCase( );}var pos=$0v.search($1h);if(pos>-1){var $1k=$0v.indexOf('{',pos);var end=$0v.indexOf('}',$1k);if(end<0){end=$0v.length;}if($1k>-1&&end>-1){$1j=$0v.slice($1k+1,end);if(!$1i){$1j=$1j.replace(',',");}else{ }}} return $1j;}function $l($0v,$1h){var $1j=null;var tag=null;if(null !=$0v){$0v.toLowerCase( );var pos=$0v.search($1h);if(pos>-1){var $1k=$0v.indexOf('(',pos);var end=$0v.indexOf(')',$1k);if($1k>-1&&end>-1){$1j=$0v.slice($1k+1,end);$1j=$1j.replace(",",");}else{ }}} return $1j;}function $J($0v,$1h){var $1j=null;var tag=null;if(null !=$0v){$0v.toLowerCase( );var pos=$0v.search($1h);if(pos>-1){var $1k=$0v.indexOf('#',pos);var end=$0v.indexOf(')',$1k);if($1k>-1&&end>-1){$1j=$0v.slice($1k+1,end);$1j=$1j.replace(",",");}else{alert('No valid syntax found for ['+$1h+'] in the str below:\n\n'+$0v);}}}return $1j;}function $K($0v,$1h){var $1j=null;var $1k=0;var end=0;var $1l=/\s+/g;var $1m=/\(/;var $1n=/\)/;var $0l=$0v.replace($1l,'');$0l=$0l.replace($1m,'');$0l=$0l.replace($1n,'');if($0l.search(/%/)>-1&&null !=$Z){for(var i in $Z){var $0w=$Z[i].split('=');var re=new RegExp($0w[0],'g');if('%'==$0w[0].charAt(0)){$0=$0l.replace(re,$0w[1]);}}}$0l+='{';var $1o=$0l.toLowerCase($1h);var pos=$1o.indexOf($1h);if(pos>-1){$1k=$0l.index Of('.',pos);end=$0l.indexOf('{',pos);if($1k>-1&&end>-1){$1j=$0l.slice($1k+1,end);}else{ }}return $1j;}function $L($0v,$1h){var $1j=null;var $1k=0l ;var end=0;var $1l=/\s+/g;var $0l=$0v.replace($1l,'');$0l+='{';var $1o=$0l.toLowerCase($1h);var pos=$1o.indexOf($1h);if(pos>-1){$1k=$0l.indexOf('.',pos);end=$0l.indexOf('{',pos);if($1k>-1&&end>-1){$0l=$0l.slice($1k+1,end);if($0l.indexOf(',')>-1){$0l.split(',');}}else { }}return $1j;}function $M($0v,$1p,$1q){var $1j=null;if(null !=$0v){$0v.toLowerCase( );$0v+=';';var pos=$0v.search($1p);if(pos>-1){var $1k=$0v.indexOf(':',pos);end=$0v.indexOf(';',pos);if($1k>-1&&end>-1){$1j=$0v.slice($1k+1,end);if(true==$1q){$1j=parseFloat($1j);}else{var $1l=/\s+/g;$1j=$1j.replace($1l,'');}}else{alert('PROGRAMMER WARNING:\n\n'+'No valid VALUE found for ['+$1p+']'+'\n'+'Error Configuration: ['+$0v+']'+'\n');}}}return $1j;}function isEcava( ){window.status='Powered by Ecava animation script Iss. L68; 05Aug2007.';}function $N( ){var $1r=$W.createElement('defs');var $17=$W.createElement('g');$17.setAttribute('id','idDefsBftnUp');var $s=$W.createElement('path');$1s.setAttribute('d','M 0,100 L 0,0 L 100,0');$1s.setAttribute('style','fill:none; stroke: whitesmoke');$17.appendChild($1s);var $1t=$W.createElement('path');$1t.setAttribute('d','M 0, 100 L 100, 100 L 100,0');$1t.setAttribute('style','fill:none; stroke:black');$17.appendChild($1t);var $1u=$W.createElement('rect');$1u.setAttribute('x',0);$ 1u.setAttribute('y',0);$1u.setAttr ibute('width', 100);$1u.setAttribute('height', 100);$1u.setAttribute('style','fill: black; fill-opacity:0.02');$17.appendChild($1 u);$1r.appendChild($17);var $1v=$W.createElement('g');$1v.setAttribute('id','idDefsBttnDn');var $1w=$W.createElement('path');$1w.setAttribute('d','M 0,100 L 0,0 L 100,0');$1w.setAttribute('style','fill:none; stroke:black');$1v.appendChild($1w);var $1x=$W.createElement('path');$1x.setAttribute('d','M 0,100 L 100, 100 L 100,0');$1x.setAttribute('style','fill: none; stroke:whitesmoke');$1v.appendChild($1x);var $1y=$W .createElement('rect');$1y.setAttribute('x',0); $1y.setAttribute('y',0);$1y.setAttr ibute('width',100); $1y.setAttribute('height',100);$1y.setAttribute('style','fill: black; fill-opacity:0.02');$1v.appendChild($1y); $1r.appendChild($1v);$X.appendChild($1r);}fun ction $O( ) {var $17=$W.createElement('g');$17.setAttribute ('id','idInsertUse');var $18=$W.createElement('use'); $18.setAttributeNS($U,'xlink:href',"#idDefsBttnUp");$1 8.setAttribute('transform','translate(200 200)');var $1z=$W.createElement('use');$1z.setAttributeNS($U, 'xlink:href',"#idDefsBftnDn");$1z .setAttribute('transform','translate(100 100)');$17.appendChild($18);$17.appendChild($1z);$X.appendChild($17);}function $P( ){var $1r=$W.createElement('defs');var $1A=$W.createElement ('filter');$1A.setAttribute('id','Drop_Shadow');$1A.setAttribute('filterUnits','objectBoundingBox');$1A.setAttribute ('x','-10%');$1A.setAttribute('y','-10%'); $1A.setAttribute('width','150%');$1A.setAttribute ('height','150%');var $1B=$W.createElement ('feGaussianBlur');$1B.setAttribute('in','SourceAlpha'); $1B.set Attribute('stdDeviation','3');$1B.setAttribute ('result','blurredAlpha');$1A.appendChild($1B); $1B=$W.createElement('feOffset');$1B.setAttribute('in', 'blurredAlpha');$1B.setAttr ibute('dx','5'); $1B.setAttribute('dy','5');$1B.setAttribute('result', 'offsetBlurredAlpha');$1A.appendChild($1B); $1B=$W.createElement('feFlood');$1B.setAttribute ('result','flood ed');$1B.setAttribute('style','flood-color: rgb(154,205,50);flood-opacity:1');$1A.appendChild($1B); $1B=$W.createElement('feComposite');$1B.setAttr ibute ('in','flooded');$1B.setAttribute('operator','in'); $1B.setAttribute('in2','offsetBlurred Alpha'); $1B.setAttribute('result','coloredShadow'); $1A.appendChild($1B);$1B=$W.cre ateElement ('feComposite');$1B.setAttribute('in','SourceGraphic'); $1B.setAttribute('in2','coloredShadow');$1B.setAttribute ('operator','over');$1A.appendChild($1B);$1r.appe ndChild($1A);$X.appendChild($1r);}function $Q( ){var $1r=$W.createElement('defs');var $1A=$W.createElement ('filter');$1A.setAttribute('id','Error_Shadow');$1A.setAttribute('filterUnits','objectBoundingBox');$1A.setAttribute ('x','-30%');$1A.setAttribute('y','-30%'); $1A.setAttribute('width','150%');$1A.setAttribute ('height','150%');var $1B=$W.createElement ('feGaussianBlur');$1B.setAttribute('in','SourceAlpha'); $1B.set Attribute('stdDeviation','3');$1B.setAttribute ('result','blurredAlpha');$1A.appendChild($1B); $1B=$W.createElement('feOffset');$1B.setAttribute('in', 'blurredAlpha');$1B.setAttr ibute('dx','0'); $1B.setAttribute('dy','0');$1B.setAttribute('result', 'offsetBlurredAlpha');$1A.appendChild($1B); $1B=$W.createElement('feFlood');$1B.setAttribute ('result','flo oded');$1B.setAttribute('style','flood-color: rgb(255,0,0);flood-opacity:1');$1A.appendChild($1B); $1B=$W.createElement('feComposite');$1B.setAttr ibute ('in','flooded');$1B.setAttribute('operator','in'); $1B.setAttribute('in2','offsetBlurred Alpha'); $1B.setAttribute('result','coloredShadow'); $1A.appendChiid($1B);$1B=$W.cre ateElement ('feComposite');$1B.setAttribute('in','SourceGraphic'); $1B.setAttribute('in2','coloredShadow');$1B.setAttribute ('operator','over');$1A.appendChild($1B);$1r.appe ndChild($1A);$X.appendChild($1r);}function $R($1C){var $1l=/\s+/g;$1C=$1C.replace($1l,"");var $1D=true;var $1E=null; var $1F=$1C.indexOf(")",0);if($1F<0) {$1F=$1C.length;}var $1G=$1C.lastindexOf("(",$1F);var $1H=$1C.substring($1G+1,$1F);var $1l=null;if($1H.indexOf('||')>-1){$1E=$1H.split('||');$1l=new Array ($1E.length);for(var i in $1E){$1l[i]=svr.get($1E[i]);if(i>0) {$1l[0]|=$1[i];}}$1l =$1l[0]l;}else if($1H.index Of('&&')>-1){$1E=$1H.split('&&');$1l=new Array ($1E.length);for(var i in $1E){$1l[i]=svr.get($1E[i]);if(i>0) {if($1l[i-1]!=$1[i]){$1D=false;$1l=null;break;}}}if (true==$1D){$1=$1l[0];}}else{var $1m=/\(+/g;var $1n=/\)+/g;$1C=$1C.replace($1m,"");$1C=$1C.replace ($1n,"");$1l=svr.get($1C);}retu rn $1l;}

We claim:
1. In a computer system for monitoring a process, the computer system having a display device and a graphical user interface for displaying on the display device the status of components used in operation of the process, each component being represented on the graphical user interface by an associated graphical object that is generated or rendered by an application from a related vector graphic file,
the improvement comprising a method of animating said graphical object to show a change in the status of the component being represented, the method comprising:
inserting into said vector graphic file an animation instruction, wherein the animation instruction:
is not executable code,
complies with a predefined syntax,
does not violate a prescribed format for the vector graphic file,
is ignored by said application; and
defines one or more animation effects that are dependent upon a value of at least one variable and a set of conditions applying to the at least one variable;
the value of said at least one variable being dependent upon the status of said component being represented;
running an interpreter engine to:
(a) recognize and parse said animation instruction,
(b) retrieve a current value of said at least one variable,
(c) determine a required animation effect based on checking the retrieved current value of the at least one variable against said set of conditions, and
(d) instruct the application to modify said graphical object to exhibit the determined animation effect; and
displaying said graphical object with the determined animation effect on the display device.

2. The method of claim 1, wherein said application is a browser that supports the format of said vector graphic file.

3. The method of claim 1, wherein said application is a browser having a plug-in vector graphic rendering engine that supports the format of said vector graphic file.

4. The method of claim 1, wherein said vector graphic file is of a text-based format.

5. The method of claim 4, wherein said vector graphic file is of Scalable Vector Graphic (SVG) format.

6. The method of claim 1, wherein said interpreter engine is loaded by said application.

7. The method of claim 1, wherein said interpreter engine comprises JavaScript®.

8. The method of claim 1, wherein said animation instruction comprises at least one attribute and said at least one variable.

9. The method of claim 8, wherein said animation instruction further comprises at least one parameter.

10. The method of claim 1, wherein step (d) comprises manipulating an object model or object properties or styles of said graphical object.

11. A computer system for monitoring a process, the computer system comprising:
- a display device;
- a graphical user interface for displaying on the display device the status of components used in operation of said process, each component being represented on the graphical user interface by an associated graphical object that is generated or rendered by an application from a related vector graphic file;
- said vector graphic file including an animation instruction inserted into the vector graphic file, wherein the animation instruction:
  - is not executable code,
  - complies with a predefined syntax,
  - does not violate a prescribed format for the vector graphic file,
  - is ignored by said application; and
  - defines one or more animation effects that are dependent upon a value of at least one variable and a set of conditions applying to the at least one variable;
- the value of said at least one variable being dependent upon the status of said component being represented; and
- an interpreter engine to:
  - (a) recognize and parse said animation instruction,
  - (b) retrieve a current value of said at least one variable,
  - (c) determine a required animation effect based on checking the retrieved current value of the at least one variable against said set of conditions, and
  - (d) instruct the application to modify said graphical object to exhibit the determined animation effect so as to show a change in status of the component being represented by said graphical object,
- wherein the display device is configured to display said graphical object with the determined animation effect.

12. The computer system of claim 11, wherein said application is a browser that supports the format of said vector graphic file.

13. The computer system of claim 11, wherein said application is a browser having a plug-in vector graphic rendering engine that supports the format of said vector graphic file.

14. The computer system of claim 11, wherein said vector graphic file is of a text-based format.

15. The computer system of claim 14, wherein said vector graphic file is of Scalable Vector Graphic (SVG) format.

16. The computer system of claim 11, wherein said interpreter engine is loaded by said application.

17. The computer system of claim 11, wherein said interpreter engine comprises JavaScript®.

18. The computer system of claim 11, wherein said animation instruction comprises at least one attribute and said at least one variable.

19. The computer system of claim 18, wherein said animation instruction further comprises at least one parameter.

20. The computer system of claim 11, wherein the interpreter engine modifies said graphical object by manipulating an object model or object properties or styles of said graphical object.

* * * * *